United States Patent
Itoh et al.

(10) Patent No.: US 6,176,805 B1
(45) Date of Patent: Jan. 23, 2001

(54) ANGULAR BEARING OF DUAL CAVITY TOROIDAL TYPE CONTINUOUSLY VARIABLE TRANSMISSION

(75) Inventors: Hiroyuki Itoh; Nobuo Goto; Makoto Fujinami; Hiroshi Kato, all of Kanagawa (JP)

(73) Assignee: NSK Ltd., Tokyo (JP)

(*) Notice: Under 35 U.S.C. 154(b), the term of this patent shall be extended for 0 days.

(21) Appl. No.: 09/288,812

(22) Filed: Apr. 9, 1999

(51) Int. Cl.[7] ............... F16H 15/38; F16H 57/04; F16C 33/58
(52) U.S. Cl. ............... 476/40; 384/450; 384/475; 384/516; 384/615; 476/8
(58) Field of Search ............... 384/450, 475, 384/516, 615; 476/8, 40, 42

(56) References Cited

U.S. PATENT DOCUMENTS

| | | | |
|---|---|---|---|
| 4,120,543 | * 10/1978 | Greene, Jr. et al. | 384/607 |
| 4,400,042 | * 8/1983 | Fritz | 384/615 |
| 5,027,668 | * 7/1991 | Nakano | 476/8 |
| 5,299,988 | * 4/1994 | Fukushima et al. | 476/42 |

* cited by examiner

*Primary Examiner*—Allan D. Herrmann
(74) *Attorney, Agent, or Firm*—Sughrue, Mion, Zinn, Macpeak & Seas, PLLC (57) ABSTRACT

An angular bearing of a dual cavity toroidal type continuously variable transmission, includes: a torque input shaft having a shaft-side raceway groove formed in an outer peripheral surface of a flange portion provided in an end thereof; a loading cam unit of a loading cam unit having a disc-side raceway groove formed in an inner peripheral surface of a jointing opening thereof, the loading cam unit located around the end of the torque input shaft; and a plurality of balls held between the shaft-side raceway groove and the disc-side raceway groove to bear thrust loads exerted on the cam disc, wherein each of an angular contact angle between the balls and the shaft-side raceway groove and an angular contact angle between the balls and the disc-side raceway groove is 60° or smaller, and each of a curvature radius of a groove surface of the shaft-side raceway groove and that of a groove surface of the disc-side raceway groove is from 52% to 55% of a diameter of the ball.

9 Claims, 9 Drawing Sheets

| ANGULAR CONTACT ANGLE(°) | CENTRIFUGAL WHIRLING OF LOADING CAM | VIBRATIONS | RESULTS OF DURABILITY TEST |
|---|---|---|---|
| 30 | 0.013 | NO VIBRATION OF CVT | REQUIRED TIME SATISFIED AND NO ABNORMALITY OBSERVED |
| 40 | 0.014 | NO VIBRATION OF CVT | REQUIRED TIME SATISFIED AND NO ABNORMALITY OBSERVED |
| 50 | 0.016 | NO VIBRATION OF CVT | REQUIRED TIME SATISFIED AND NO ABNORMALITY OBSERVED |
| 60 | 0.021 | NO VIBRATION OF CVT | REQUIRED TIME SATISFIED AND NO ABNORMALITY OBSERVED |
| 70 | 0.041 | CVT VIBRATED | PREMATURE WEAR TOOK PLACE IN LOADING CAM PORTION IN DURABILITY TEST AND REQUIRED TIME WAS NOT REALIZED |
| 80 | 0.069 | CVT VIBRATED | PREMATURE SEPARATION TOOK PLACE IN LOADING CAM PORTION IN DURABILITY TEST AND THRUST BECAME INSUFFICIEND, CAUSING TRACTION PORTION TO BE SLIPPED. REQUIRED TIME WAS NOT SATISFIED |

ANGULAR BEARING OF DUAL CAVITY TOROIDAL TYPE CONTINUOUSLY VARIABLE TRANSMISSION

GROUND OF THE INVENTION

1. Field of the Invention

The present invention relates to an angular bearing which is adaptable to a dual cavity toroidal type continuously variable transmission for use as a transmission for, for example, an automobile and which is disposed in a joint portion between a cam disc constituting a loading cam unit and an end of a torque input shaft to bear a load which is added to the cam disc in a thrust direction.

2. Description of the Related Art

A toroidal type continuously variable transmission which has been developed and researched to serve as a transmission adapted mainly to an automobile incorporates at least one toroidal transmission mechanism. The toroidal transmission mechanism is structured by combining input and output discs and a plurality of rotative power rollers held between the two discs with each other, the input and output discs having opposite surfaces each of which has a cross sectional shape formed into a circular arc recess. The input disc is integrally and rotatively joined to a torque input shaft. Moreover, the input disc is engaged to the torque input shaft to limit movement of the input disc toward the torque input shaft. On the other hand, the output disc is relatively rotatively joined to the torque input shaft. Moreover, the output disc is joined to be opposite to the input disc such that movement of the output disc in a direction apart from the input disc is limited.

When the input disc of the toroidal transmission mechanism is rotated, the output disc is inversely rotated through the power rollers. Therefore, the rotational motion, which is input to the input shaft is, as rotational motion in the inverse direction, transmitted to an output gear joined to the output disc so as to be output from the output shaft. At this time, the outer surfaces of the power rollers are brought into contact with a position adjacent to the outer surface of the input disc and the central portion of the output disc by changing the angle of inclination of the rotational shaft of each power roller. Thus, acceleration from the torque input shaft to the output gear is permitted. Inversely, the outer surfaces of the power rollers are brought into contact with the position adjacent to the central portion of the input disc and the outer surface of the output disc by changing the angle of inclination of each power roller. Thus, deceleration from the torque input shaft to the output gear is permitted. Also intermediate gear ratios between the two gear ratios can be realized in a continuously variable manner by adequately adjusting the angle of inclination of the rotational shaft of each power roller.

To be adaptable to greater input/output torque, a dual cavity toroidal type continuously variable transmission has been disclosed which is constituted by, in parallel, connecting two toroidal transmission mechanisms to each other on the same axis. The parallel-connection dual cavity toroidal type continuously variable transmission incorporates two output discs which are provided for front and rear toroidal transmission mechanisms, respectively. The rear surfaces of the two output discs are connected to each other through one output gear shaft. A loading cam unit, which is capable of enlarging/reducing the pressure corresponding to the magnitude of the input torque and applied in the direction of the torque input shaft, is disposed between either of the input discs and an end of the torque input shaft.

The loading cam unit has two cam surfaces each of which is disposed on either side of the cam disc and the surface of the input disc opposite to the cam disc. Moreover, the loading cam unit has a plurality of rolling elements which are, by a holding plate, held between the foregoing cam surfaces such that rolling is permitted. When the rolling elements are rolled, the cam disc is pressed against the power rollers. Thus, frictional force having appropriate magnitude is always generated between the input disc and the outer surface of each power roller and between the outer surface of each power roller and the output disc. The cam disc is, through an angular bearing, rotatively connected to a projecting jaw portion formed around the outer periphery of the end of the torque input shaft.

The angular bearing has two raceway grooves provided adjacent to the shaft and the disc and a plurality of balls held between the two raceway grooves. Thus, a thrust load applied to the cam disc is borne. The raceway groove located to the shaft side (hereinafter, the shaft-side raceway groove) is formed in the outer surface of the projecting jaw portion formed in the outer periphery of the end of the torque input shaft, the foregoing raceway groove being formed in a circumferential direction of the torque input shaft. On the other hand, the raceway groove located to the disc side (hereinafter, the disc-side raceway groove) is formed in the inner surface of a joining opening formed in the central portion of the cam disc, the disc-side raceway groove adjacent being formed in the circumferential direction of the cam disc. Moreover, a holding unit for disposing the plural balls at appropriate intervals is combined, if necessary.

The parallel-connection dual cavity toroidal type continuously variable transmission has the one output gear which is integrated with the output gear shaft and which is simultaneously rotated by the two output discs from two sides. Thus, reaction force having the same magnitude of the pressure which is directly applied to the input disc adjacent to the loading cam unit is made to simultaneously be exerted to the other input disc through the angular bearing and the torque input shaft. Thus, the magnitude of the torque which is transmitted to each of the two output discs is made to be the same.

A situation will now be-considered in which a defective operation of the angular bearing disposed between the cam disc and the torque input shaft enlarges or reduce the rotation resistance of only either toroidal transmission mechanism. In this case, the equilibrium state of the torque which is transmitted by the four power rollers is lost. Thus, synchronization in the transmission between the front and rear toroidal transmission mechanisms is disordered. Moreover, each power roller encounters hunting and vibrations, causing the overall transmission performance of the toroidal type continuously variable transmission and durability of the same to deteriorate. Further, a portion of the power rollers may bear torque larger than a limit of the designed torque. In the foregoing case, safety of a traction portion against the gross slip deteriorates, causing possibility of occurrence of slips at high temperatures to be raised. To prevent the above-mentioned problems, the angular bearing of the dual cavity toroidal type continuously variable transmission must minimize rotational friction loss in the bearing to make the magnitude of the torque which is transmitted to each of the front and rear toroidal transmission mechanisms to be the same.

If loads in the thrust and radial directions exerting on the cam disc of the toroidal continuously variable transmission are enlarged and, therefore, the load of the angular bearing is enlarged, the angular contact angle of each ball is gradually enlarged. As a result, a point of contact between each ball and each raceway groove approaches a shoulder portion of the raceway groove. Therefore, if a large torque is input to the cam disc, a so-called edge load state occurs in which the contact ellipse of the bearing runs on the shoulder portion of the raceway groove. Thus, the pressure at the point of contact between the balls and each raceway groove is raised excessively. Therefore, there is apprehension that the bearing encounters premature separation. When the large load is input, the cam disc is warped, that is, deformed outwards. Therefore, the shape of the disc-side raceway groove in the inner surface of the joining opening formed in the central portion of the disc is distorted. As a result, the contact ellipse furthermore runs on the shoulder portion of the raceway groove. What is worse, frictional loss becomes excessively enlarged, causing slips of the toroidal transmission mechanism to take place. As a result, the function of the transmission cannot be obtained. Therefore, the angular bearing of the toroidal continuously variable transmission must previously be provided with sufficient angular contact angle and bearing load when the bearing is designed so as to satisfactorily prevent running of the contact ellipse on the shoulder portion of the bearing groove.

The cam disc is rolled and rotated in a state of contact with each rolling element which reciprocates in a limited region interposed between two cam crests. Therefore, the balls of the angular bearing disposed between the torque input shaft and the cam disc always repeat rolling in a predetermined operating range. Moreover, the contact ellipse exists adjacent to the point of contact between the balls and each raceway groove, causing the operating condition for the balls to be severe. To cause the angular bearing of the toroidal continuously variable transmission which is operated under the above-mentioned severe conditions to have satisfactory durability, the bearing must sufficiently be lubricated.

To satisfy the above-mentioned requirements, design must previously be performed about the angular contact angle, the radius of the raceway groove, the shape of the shoulder of the bearing groove and the lubricating method of the angular bearing in view of improving the durability of the bearing and reducing frictional loss. However, the conventional angular bearing of the dual cavity toroidal type continuously variable transmission has been designed similarly to the usual bearing. Therefore, any contribution has not been made to overcome the problems peculiarly experienced with the toroidal type continuously variable transmission, and more particularly, to the dual cavity toroidal type continuously variable transmission.

SUMMARY OF THE INVENTION

In view of the foregoing, an object of the present invention is to provide an angular bearing of a dual cavity toroidal type continuously variable transmission designed to have optimized dimensions and lubricating passages so as to improve the durability of the bearing portion and reduce a rotation loss so that the lifetime is elongated and the efficiency is improved.

According to one aspect of the present invention, there is provided an angular bearing of a dual cavity toroidal type continuously variable transmission, including: a torque input shaft having a shaft-side raceway groove formed in an outer peripheral surface of a flange portion (a projecting jaw portion) provided in an end thereof; a cam disc of a loading cam unit having a disc-side raceway groove formed in an inner peripheral surface of a jointing opening thereof, the cam disc located around the end of the torque input shaft; and a plurality of balls held between the shaft-side raceway groove and the disc-side raceway groove to bear thrust loads exerted on the cam disc, wherein each of an angular contact angle between the balls and the shaft-side raceway groove and an angular contact angle between the balls and the disc-side raceway groove is 60° or smaller, and each of a curvature radius of a groove surface of the shaft-side raceway groove and that of a groove surface of the disc-side raceway groove is from 52% to 55% of a diameter of the ball.

The angular bearing of a dual cavity toroidal type continuously variable transmission according to the present invention may be structured such that the shaft-side raceway groove includes: a bottom portion which intersects a perpendicular extending from the center of each of the plural balls to the outer surface of the torque input shaft; a first shoulder portion disposed on an edge adjacent to the end of the torque input shaft, a diameter of rotation of which is larger than a PCD of the ball; and a second shoulder portion disposed on the other edge apart from the end of the torque input shaft, a diameter of rotation of which is not smaller than a PCD of the bottom of the shaft-side raceway groove.

The angular bearing of a dual cavity toroidal type continuously variable transmission according to the present invention may be structured such that the disc-side raceway groove includes: a bottom portion which intersects a perpendicular extending from the center of each of the plural balls to the outer surface of the torque input shaft; a first shoulder portion disposed on an edge apart from the end of the torque input shaft, a diameter of rotation of which is smaller than a pitch circle diameter (PCD) of the ball; and a second shoulder portion disposed on the other edge adjacent to the end of the torque input shaft, a diameter of rotation of which is not larger than a PCD of the bottom of the shaft-side raceway groove.

The angular bearing of a dual cavity toroidal type continuously variable transmission according to the present invention may be structured such that the input shaft has a plurality of shaft-side oil paths, each of which communicates an oil supply opening formed inside of the torque input shaft and an opening in the vicinity of the shaft-side raceway groove with each other, and the cam disc has a plurality of disc-side oil paths, each of which communicates an opening in the vicinity of the disc-side raceway groove and a cam surface of the cam disc with each other.

Other objects, features and advantages of the invention will be evident from the following detailed description of the preferred embodiments described in conjunction with the attached drawings.

DETAILED DESCRIPTION OF THE PREFERRED EMBODIMENTS

Figure 1:
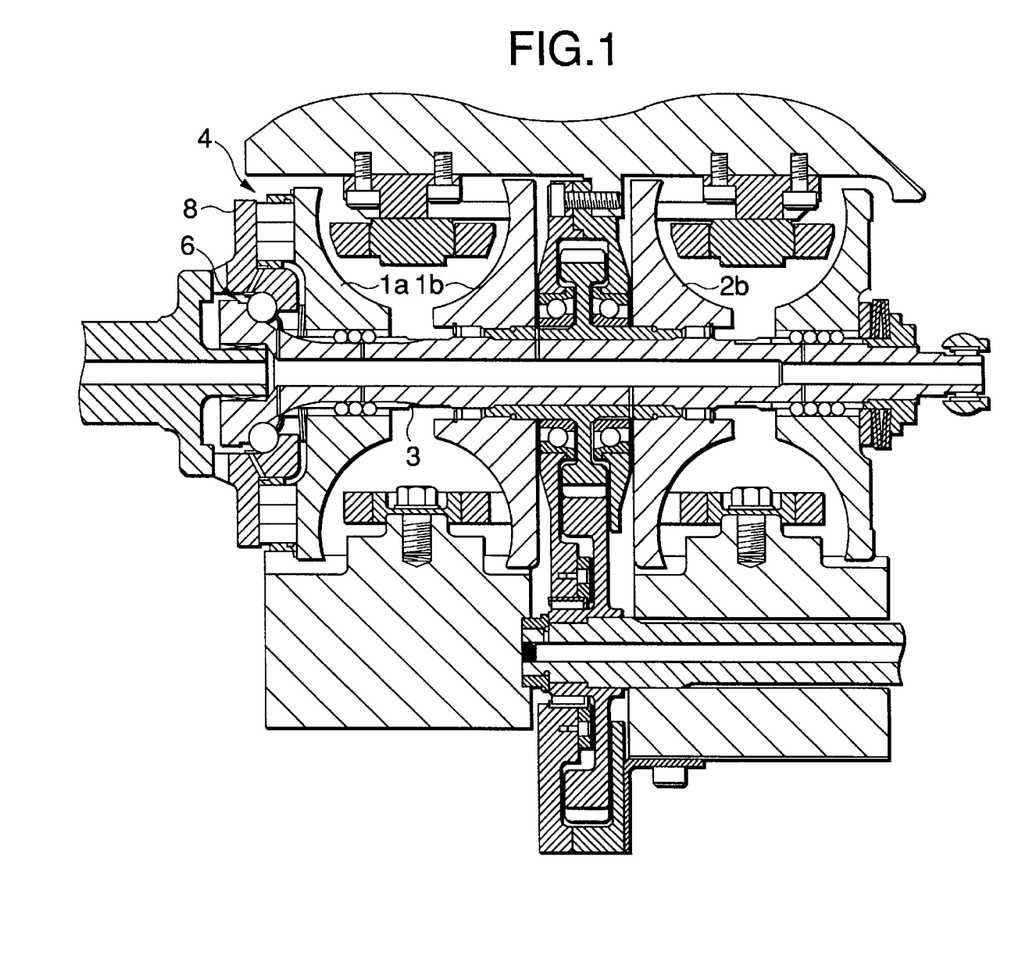
FIG. 1 is a cross sectional view of a parallel-connection dual cavity toroidal type continuously variable transmission incorporating an angular bearing according to an embodiment of the present invention.

FIG. 1 is an overall schematic view showing a parallel-connection dual cavity toroidal type continuously variable transmission including an embodiment of an angular bearing according to the present invention. Similarly to a conventional parallel-connection dual cavity toroidal type continuously variable transmission, rear sides of output discs 1b and 2b of the front and rear toroidal transmission mechanism are connected to each other. A loading cam unit 4 is disposed between the input disc 1a and an end of the torque input shaft 3. A cam disc 8, which constitutes the loading cam unit 4, and an end of the torque input shaft 3 are connected to each other by an angular bearing 6.

Figure 2:
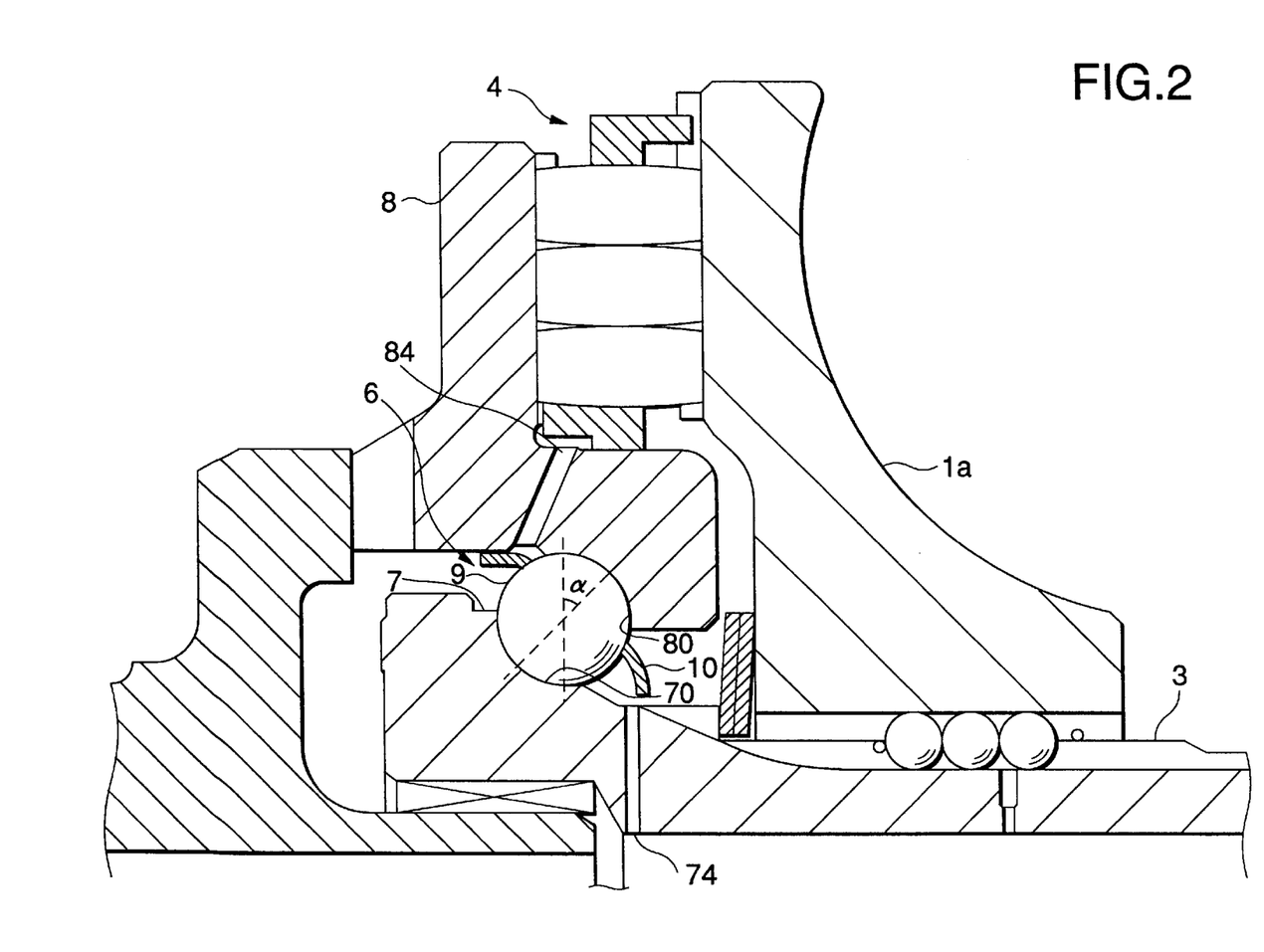
FIG. 2 is an enlarged cross sectional view of the embodiment of the angular bearing according to the present invention.

FIG. 2 is an enlarged view showing a portion including the angular bearing 6 according to the present invention. Similarly to the conventional angular bearing, a disc-side raceway groove 80 is formed in the inner surface of a joining opening formed in the central portion of the cam disc 8. In cooperation with a shaft-side raceway groove 70 formed in the outer surface of a projecting jaw portion 7 formed in the outer periphery of an end of the torque input shaft 3, a plurality of balls 9 are held. A holding unit 10 for positioning the balls 9 apart from one another for an appropriate distances is disposed between the shaft-side raceway groove 70 and the disc-side raceway groove 80. Note that the angle indicated by symbol a shown in FIG. 2 represents an angular contact angle.

In general, a basic static load rating for use as an index of the durability of a ball bearing is the magnitude of a static load which is input in a state in which a contact pressure of 4200 MPa (428 kgf/mm$^2$) is being generated. Therefore, the angular bearing according to the present invention which is a swingable rotational bearing is designed such that the contact pressure does not exceed the foregoing value even if a maximum load is input. Thus, required durability of the bearing portion can be maintained.

Figure 3:
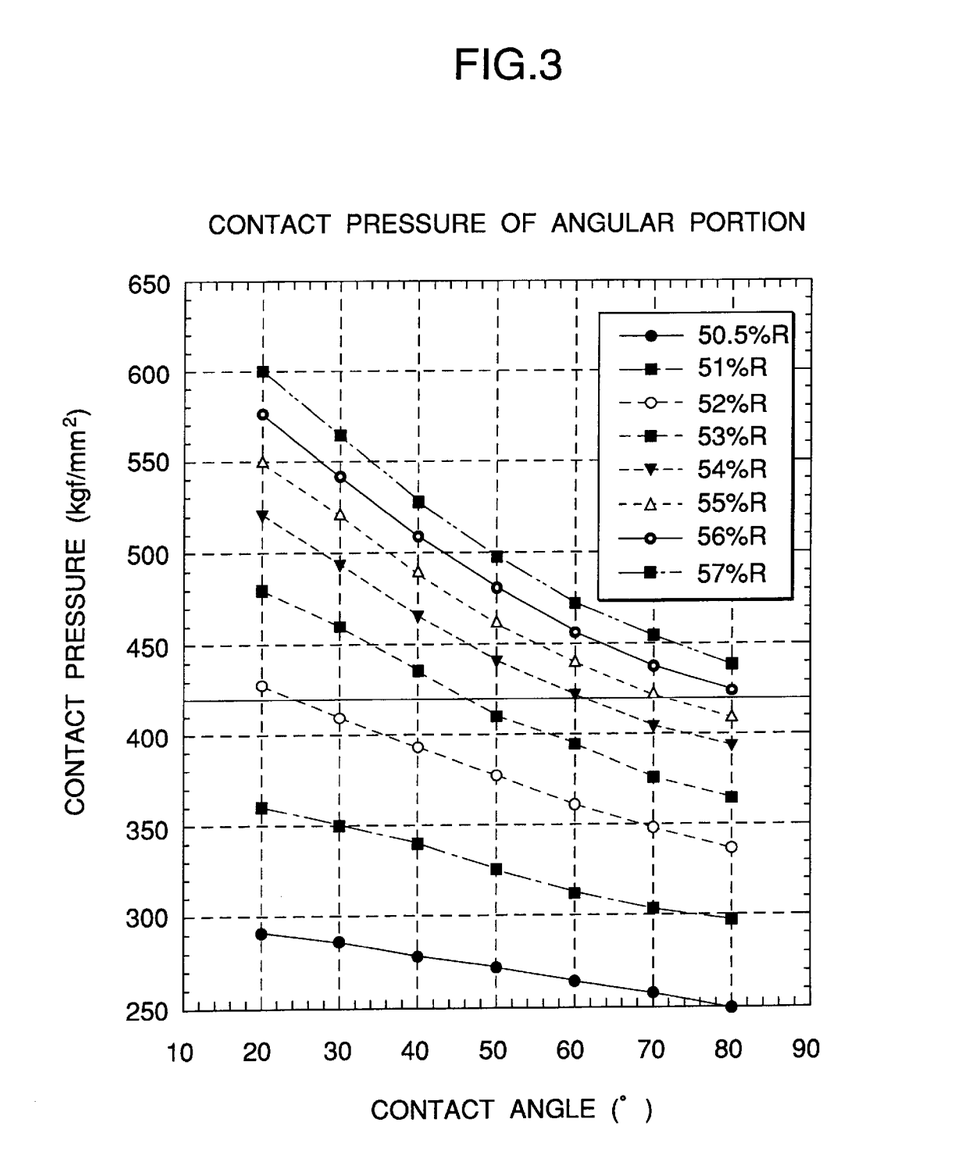
FIG. 3 is a graph showing the relationship between angular contact angles in a design stage, which have been changed and contact pressures at points of contact, which is realized in the embodiment of the angular bearing according to the present invention.

FIG. 3 is a graph showing the relationships established in an embodiment of the angular bearing according to the present invention adaptable to input torque of 30 kgf·m to 40 kgf·m, the relationship being between angular contact angles in a design stage, which have been varied, and contact pressures at the point of contact. The graph shows the relationships for each of the ratios of curvature radii of the groove surface of the shaft-side raceway groove and the diameters of the balls or each of the ratios of curvature radii of the disc-side raceway groove and the diameters of the balls (hereinafter the above-mentioned two ratios are collectively called groove R ratios). Referring to the graph shown in FIG. 3, the angular bearings provided with the groove R ratios not higher than 55% result in that contact pressures are lower than 428 kgf/mm$^2$ (the basic static load rating) in at least a portion of the angular contact angles of angular contact angles of 20° to 80°. On the other hand, the angular bearings provided with the groove R ratios of 56% and 57% result in that contact pressures exceed 428 kgf/mm$^2$ (the basic static load rating) at all of the angular contact angles of 20° to 80°. Therefore, impressions of the raceway groove and the balls of the angular bearing cannot be prevented by varying the angular contact angle. Therefore, the groove R ratio is set to be 55% or lower so that impressions are prevented at any one of the angular contact angles of 20° to 80°. Also an angular bearing (not shown) adaptable to input torque of 20 kgf to 30 kgf shows similar tendency.

To maintain the transmission synchronization between the front and rear toroidal transmission mechanisms connected to each other in parallel, the friction loss of the angular bearing must be reduced. The angular bearing of the toroidal continuously variable transmission, which is a swingable rotational bearing, encounters a maximum friction loss when rotation of the angular bearing is started. Since the maximum friction loss is the same as a start torque for the angular bearing, the start torque must be minimized.

Figure 4:
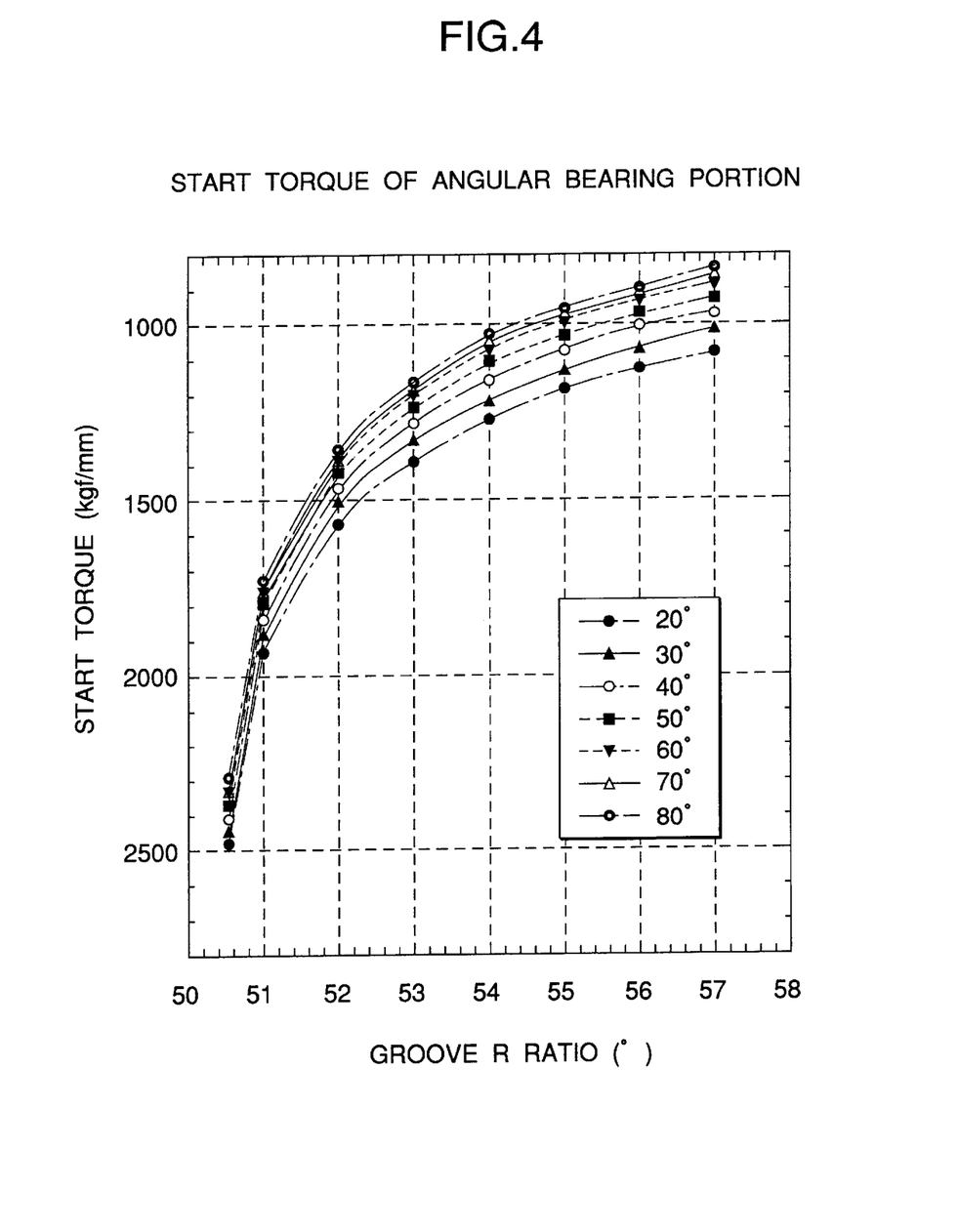
FIG. 4 is a graph showing the relationship between groove R ratios in a design stage, which have been changed and start torque, which is realized in the embodiment of the angular bearing according to the present invention.

FIG. 4 is a graph showing the relationships between the groove R ratios in a design stage, which have been changed, and start torque for each of the angular contact angles, the designed groove R ratios being ratios of the angular bearing according to the present invention and adaptable to input torque of 30 kgf·m to 40 kgf·m similarly to that shown in FIG. 3. Referring to the graph shown in FIG. 4, no change in the start torque occurs among the angular contact angles. That is, when the groove R ratio is lower than 52%, the start torque is considerably enlarged at all of the angular contact angles. In particular, the start torque at all of the angular contact angles is extremely enlarged at groove R ratios of 51% and 50.5%. Therefore, when the groove R ratio is made to be 52% or higher, the friction loss occurring in the bearing portion can be minimized. Also an angular bearing (not shown) adaptable to input torque of 20 kgf·m to 30 kgf·m results in similar tendency. To simultaneously satisfy the two conditions above, the groove R ratio of the angular bearing of the toroidal continuously variable transmission must satisfy 52% to 55%.

A fact about the angular bearing has been known that an allowable load in the radial direction is reduced in inverse proportion to the angular contact angle. Thus, the radial rigidity decreases. Since the symmetry in the circumferential direction is not apparent owning to a cam disc of a loading cam unit having a cam surface formed continuously in the circumferential direction, a satisfactory rotation balance cannot be realized owning to the influence. Therefore, the foregoing cam disc cannot correctly be rotated owning to shortage of radial rigidity in the angular bearing portion. As a result, deflection and vibrations are intensified.

Figure 5:
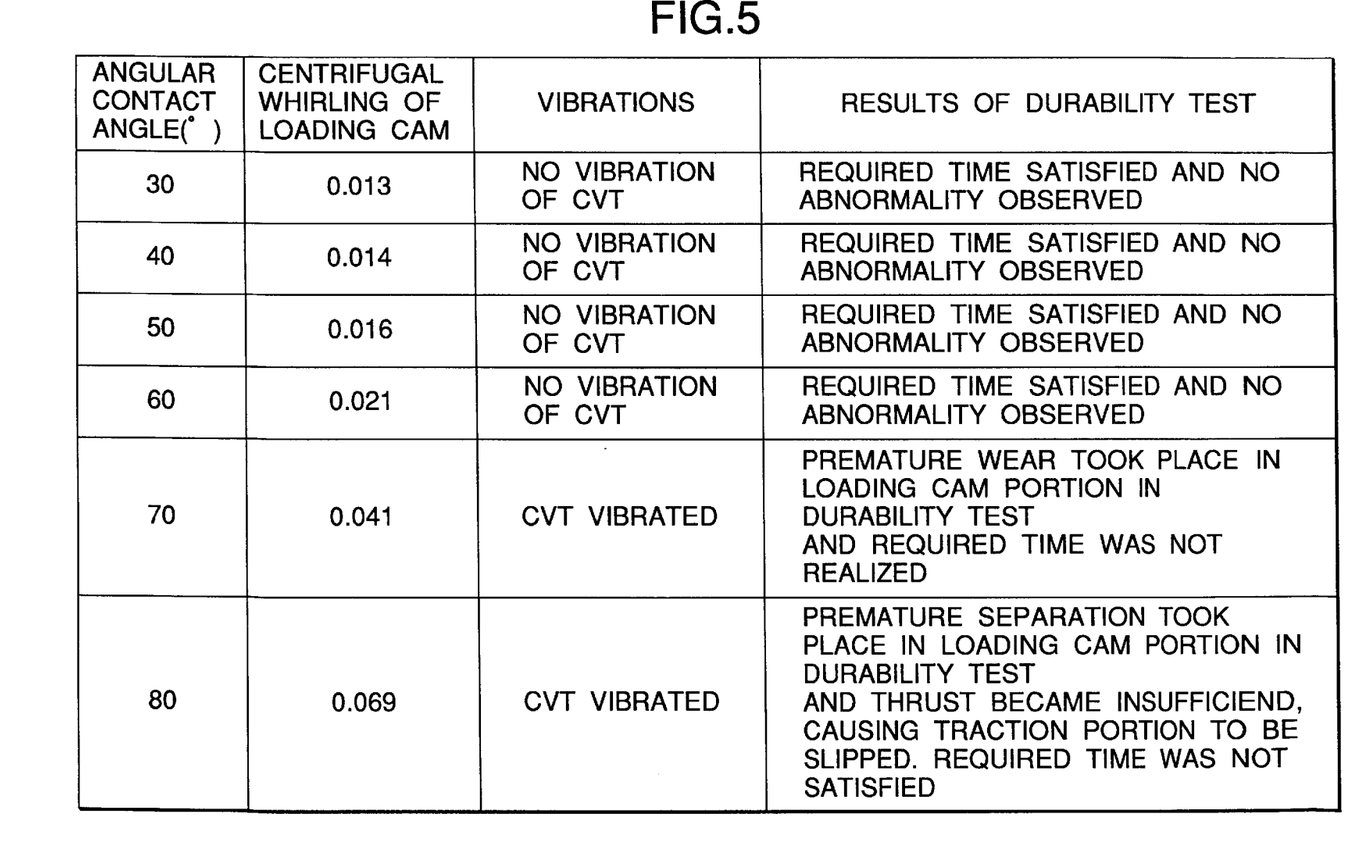
FIG. 5 is a table showing magnitude of deflection and whether or not vibrations occurs during the operation of a loading cam unit and results of a durability test, which is realized in the embodiment of the angular bearing according to the present invention.

FIG. 5 is a table showing the following factors of the embodiment of the angular bearings according to the present invention and having angular contact angles of 30° to 80°. FIG. 3 shows amplitudes of deflections produced by the cam disc and whether or not vibrations of the toroidal continuously variable transmission occur during the operation of the loading cam unit and results of durability tests. The angular bearings having the angular contact angles of 70° and 80° respectively cause the cam disc to encounter centrifugal whirling of 0.04 mm to 0.07 mm. Thus, the toroidal continuously variable transmission is vibrated. As a result, the operating hour is not been achieved to required hour owing to influences of premature abrasion and separation. The angular bearing having the angular contact angle of 80° encounters insufficient pressure exerted from the loading cam unit. Thus, slips occur in the toroidal transmission mechanism portion.

Figure 6:
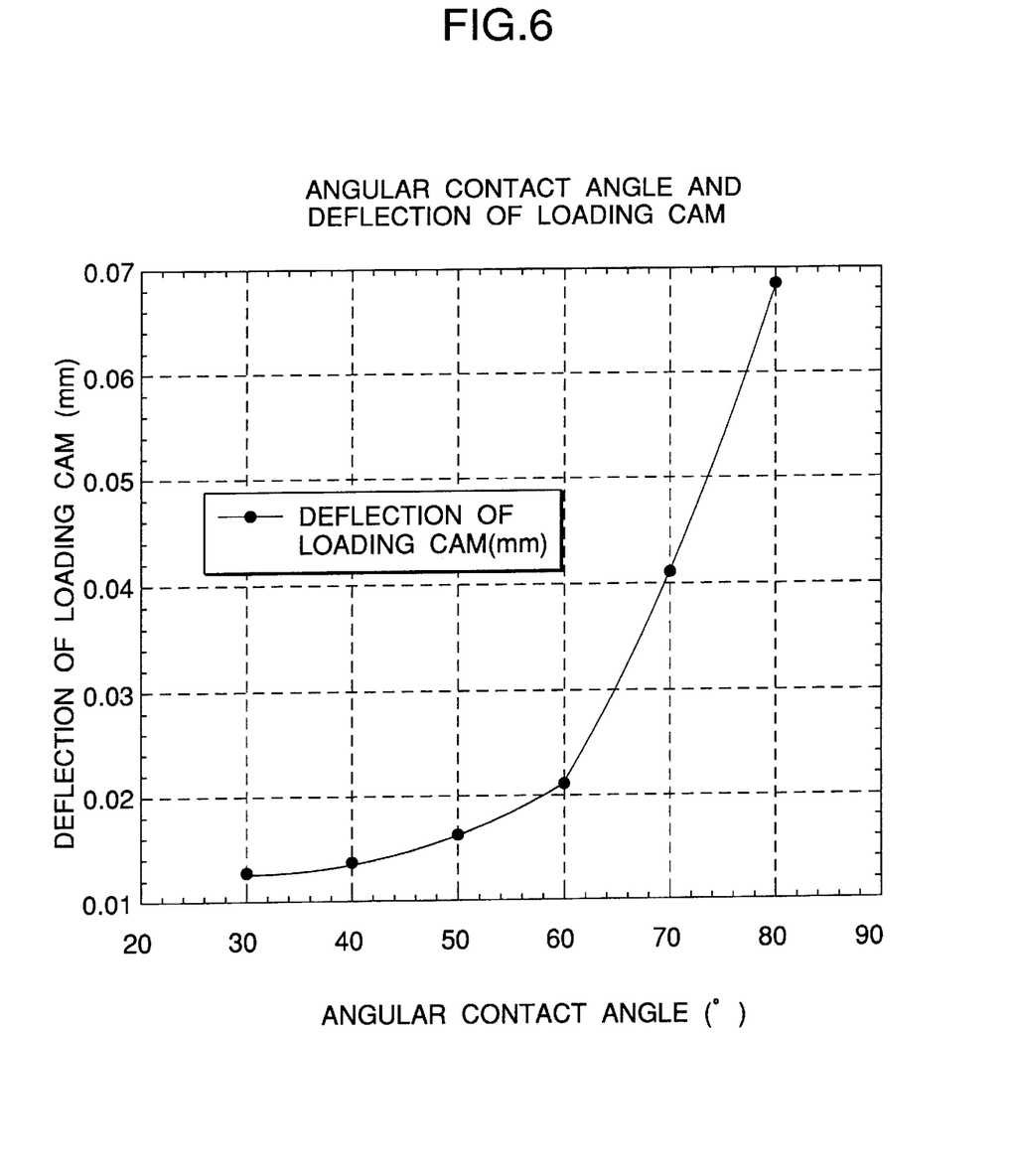
FIG. 6 is a graph showing the relationship between the angular contact angles and amplitudes of deflection of a cam disc shown in the table of FIG. 5.

FIG. 6 is a graph showing result of the above-mentioned durability test about the relationship between the angular contact angles and amplitudes of deflections of the cam disc. When the angular contact angle is not larger than 60°, the deflection is not changed considerably. When the angular contact angle exceeds 60°, the deflection is rapidly intensified. Therefore, the angular bearing of the toroidal continuously variable transmission must have the angular contact angle which is 60° or smaller.

When the three conditions are put together, each of the angular contact angle between the balls and the shaft-side raceway groove and the angular contact angle between the balls and the disc-side raceway groove is made to be 60° or smaller. Moreover, each of the curvature radius of the groove surface of the shaft-side raceway groove and that of the groove surface of the disc-side raceway groove is made to be 52% to 55% of the diameter of the ball. In the foregoing case, a most efficient angular bearing having excellent durability can be obtained.

Figure 7A:
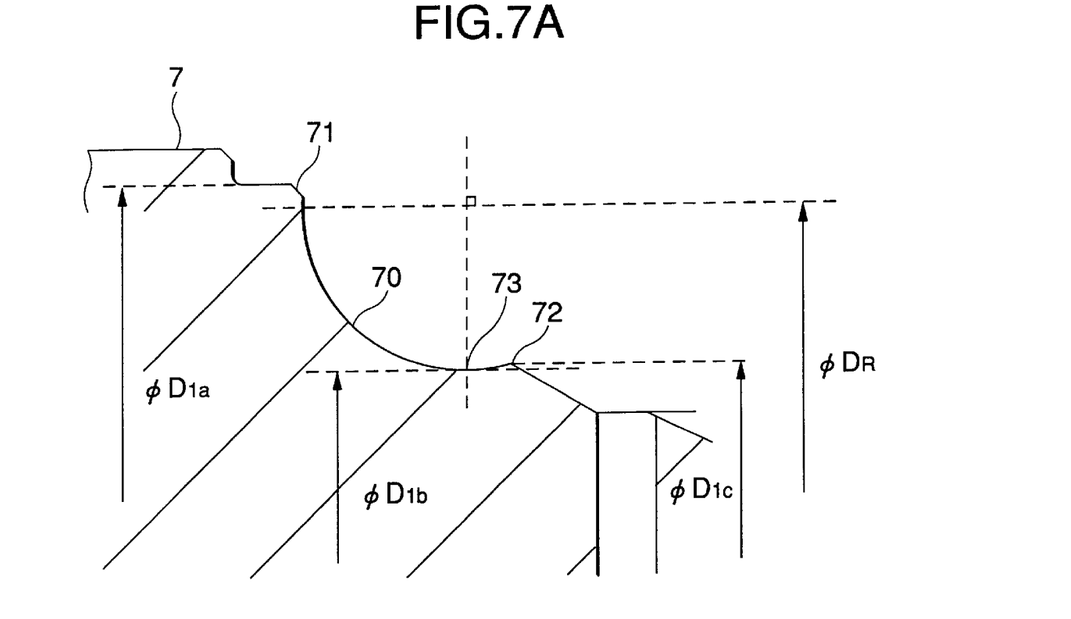
FIGS. 7A and 7B are enlarged cross sectional views of a shaft-side raceway groove of the angular bearing according to the embodiment of the present invention shown in FIG. 2.
Figure 7B:
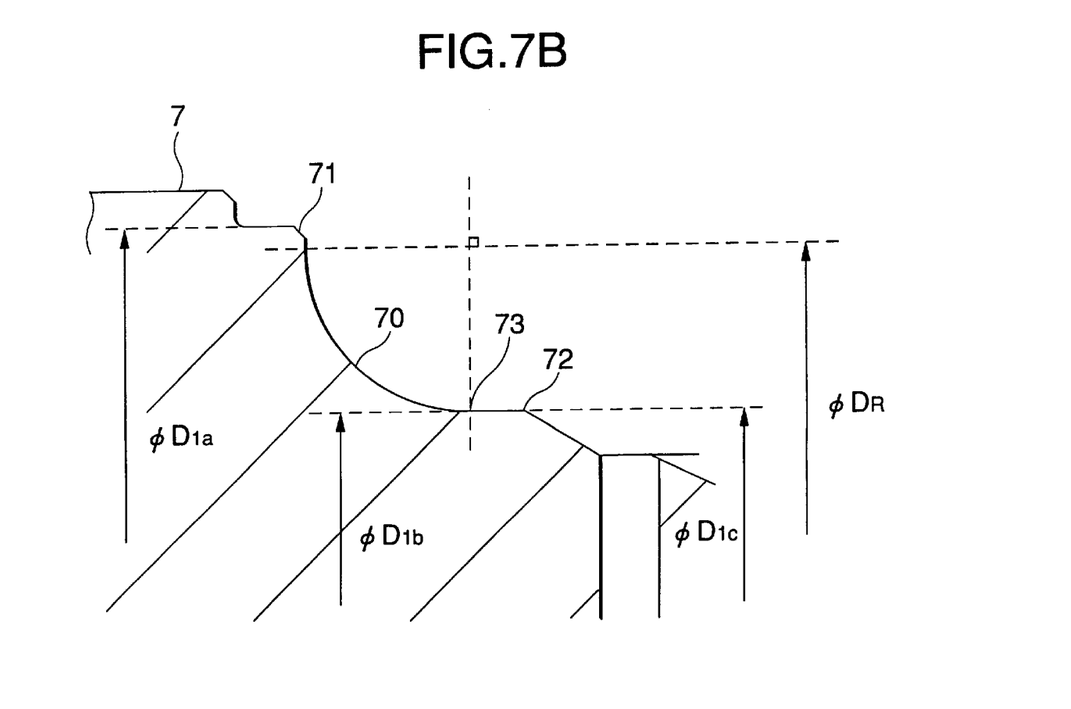

FIGS. 7A and 7B are enlarged views showing the shaft-side raceway groove 70 of the embodiment of the angular bearing according to the present invention shown in FIG. 2. The shaft-side raceway groove 70 is formed on the outer surface of the projecting jaw portion 7 formed in the outer periphery of the end of the torque input shaft 3. The shaft-side raceway groove 70 is formed around the torque input shaft 3 in the circumferential direction. The groove surface of the shaft-side raceway groove 70 is formed into a curved shape obtained by, around the torque input shaft 3, rotating a circular arc having a central angle of about 90° extending from a direction substantially in parallel with the torque input shaft 3 to a direction substantially perpendicular to the torque input shaft 3. Shoulder portions 71 and 72 are formed at an edge of the shaft-side raceway groove 70 adjacent to the end of the torque input shaft 3 and at another edge apart from the torque input shaft 3. The shaft-side raceway groove 70 has a bottom 73 which intersects a perpendicular downwards extending from the centers of the plural balls 9 toward the outer surface of the torque input shaft 3.

Referring to FIGS. 7A and 7B, symbol $\phi D_{1a}$ represents a diameter of rotation of the shoulder portion 71 adjacent to the end of the torque input shaft 3, symbol $\phi D_{1b}$ represents a diameter of rotation (PCD size of the bottom 73) of the bottom 73, symbol $\phi D_{1c}$ represents a diameter of rotation of the shoulder portion 72 apart from the end of the torque input shaft 3 and symbol $\phi D_R$ represents a diameter (the PCD diameter of the ball 9) of a locus of the ball 9 obtained by connecting the centers of the plural balls 9 to once another. The shaft-side raceway groove 70 of the angular bearing according to the present invention has dimensions determined such that the value of $\phi D_{1a}$ is larger than the value of $\phi D_R$ and the value of $\phi D_{1c}$ is the same as that of $\phi D_{1b}$ or larger than the value of $\phi D_{1b}$. As a result, even if the angular contact angle is enlarged as the torque input to the bearing is enlarged, the contact ellipse does not run over the shoulder portion 71 adjacent to the end of the torque input shaft 3. Note that FIG. 7A shows an example in which the value of $\phi D_{1c}$ is larger than that of $\phi D_{1b}$ and FIG. 7B shows an example in which the value of $\phi D_{1c}$ is the same as that of $\phi D_{1b}$.

Figure 8A:
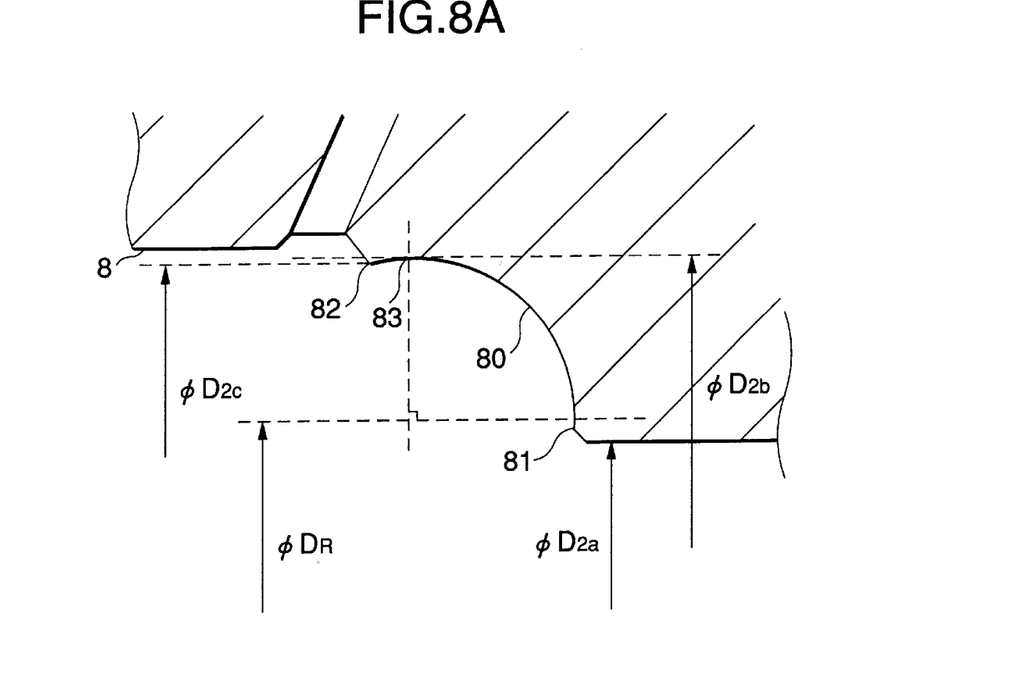
FIGS. 8A and 8B are enlarged cross sectional views of a disc-side raceway groove of the angular bearing according to the embodiment of the present invention shown in FIG. 2.
Figure 8B:
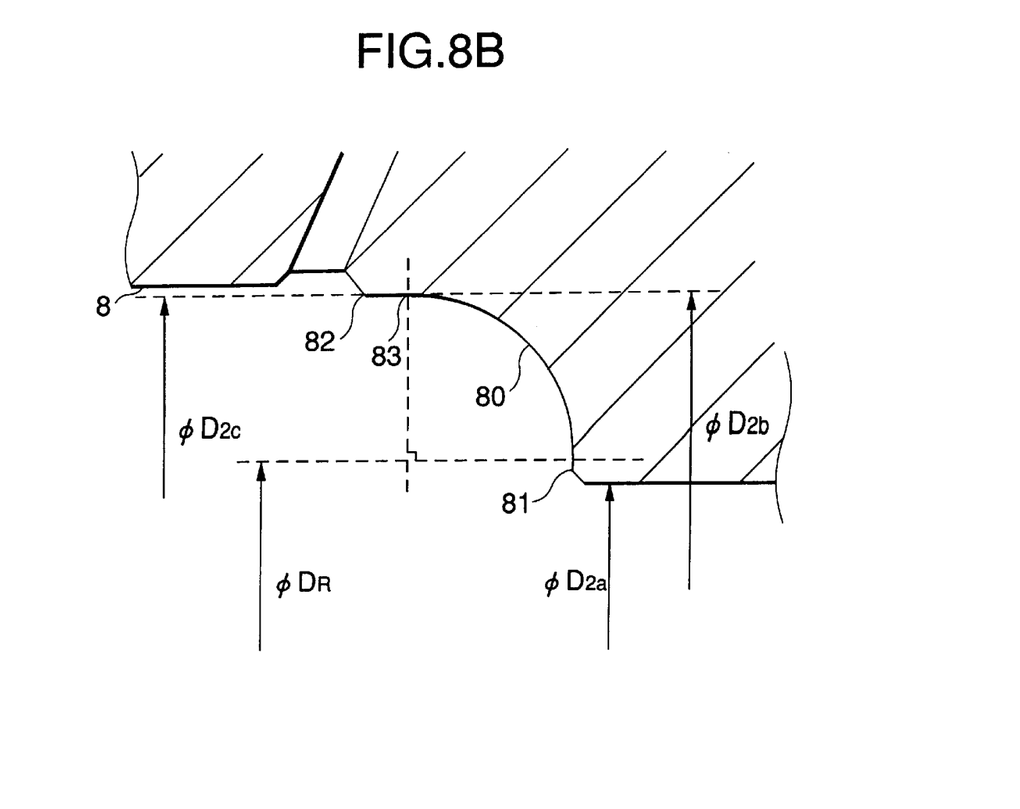

FIGS. 8A and 8B are enlarged views showing the disc-side raceway groove 80 of the angular bearing according to an embodiment of the present invention shown in FIG. 2. The disc-side raceway groove 80 is formed in the inner surface of the joining opening formed in the central portion of the cam disc 8. The disc-side raceway groove 80 is formed around the torque input shaft 3 in the circumferential direction. The groove surface of the disc-side raceway groove 80 is formed into a curved shape obtained by, around the torque input shaft 3, rotating a circular arc having a central angle of about 90° extending from a direction substantially in parallel with the torque input shaft 3 to a direction substantially perpendicular to the torque input shaft 3. Shoulder portions 81 and 82 are formed at an edge of the disc-side raceway groove 80 adjacent to the end of the torque input shaft 3 and at another edge apart from the torque input shaft 3. The disc-side raceway groove 80 has a bottom 83 which intersects an extension of a perpendicular downwards extending from the centers of the plural balls 9 toward the outer surface of the torque input shaft 3.

Referring to FIGS. 8A and 8B, symbol $\phi D_{2a}$ represents a diameter of rotation of the shoulder portion 81 apart from the end of the torque input shaft 3, symbol $\phi D_{2b}$ represents a diameter of rotation (PCD size of the bottom 83) of the bottom 83, symbol $\phi D_{2c}$ represents a diameter of rotation of the shoulder portion 82 adjacent to the end of the torque input shaft 3 and the symbol $\phi D_R$ represents the diameter (the PCD diameter of the ball 9) of a locus of the ball 9 obtained by connecting the centers of the plural balls 9 to once another. The disc-side raceway groove 80 of the angular bearing according to the present invention have dimensions determined such that the value of $\phi D_{2a}$ is smaller than the value of $\phi D_R$ and the value of $\phi D_{2c}$ is the same as the value of $\phi D_{2b}$ or smaller than the value of $\phi D_{2b}$. As a result, even if the angular contact angle is enlarged as the torque input to the bearing is enlarged, the contact ellipse does not run over the shoulder portion 81 because of the same reason for the above-mentioned shaft-side raceway groove 70. Note that FIG. 8A shows an example in which the value of $\phi D_{2c}$ is smaller than the value of $\phi D_{2b}$ and FIG. 8B shows an example in which the value of $\phi D_{2c}$ is the same as that of $\phi D_{2b}$.

If the shaft-side raceway groove 70 and the disc-side raceway groove 80 of the angular bearing according to the present invention do not extend to the bottom portions 73 and 83 respectively, the point of contact between each raceway groove and the balls 9 is moved toward outside as the angular contact angle is enlarged. Therefore, no problem arises when the angular bearing is rotated. Since existence of the bottom portions 73 and 83 is able to reduce an error which is made when the curvature radius of each groove surface is measured with a probe, the central position of each groove surface which is obtained in accordance with the measured value can accurately be obtained. As a result, design can be performed in accordance with appropriate dimensions and tolerances. Since dispersion among products can be predicted to a certain extent, the product can reliably be insured.

The embodiment of the angular bearing 6 according to the present invention shown in FIG. 2 has at least one shaft-side oil path 74 formed in a wall adjacent to the jaw portion 7 of the torque input shaft 3. The shaft-side oil paths 74 communicate an oil supply openings formed in the central portion of the torque input shaft 3 and a position adjacent to the shaft-side raceway groove 70 with each other. Moreover, a plurality of disc-side oil paths 84 are formed in the cam disc 8, the disc-side oil paths 84 established the communication between a position adjacent to the disc-side raceway groove 80 and the cam surface of the cam disc 8. The oil paths 74 and 84 initially introduce lubricating oil from each of the shaft-side oil paths 74 into the angular bearing 6. The foregoing lubricating oil is lubricating oil pumped out from an oil supply pump (not shown) so as to be supplied to required portions of the toroidal continuously variable transmission through the oil supply opening formed at the center of the torque input shaft 3. Then, lubricating oil is sequentially discharged from each of the disc-side oil paths 84 to the cam surface of the loading cam unit 4. The oil supply pump maybe provided in either the external of the troidal continuously variable transmission, or the internal thereof.

Lubricating oil introduced from the shaft-side oil paths 74 to the angular bearing 6 initially lubricates the points of contact among the shaft-side raceway groove 70 and the balls 9, and further lubricates the points of contact among the balls 9 and the holding unit 10. Then, centrifugal force conveys lubricating oil toward the cam disc 8 so that positions adjacent to the points of contact among the disc-side raceway groove 80 and the balls 9 are lubricated. A portion of lubricating oil which has completed lubricating of the positions adjacent to the points of contact among the disc-side raceway groove 80 and the balls 9 is discharged to a position adjacent to the cam surface of the loading cam unit 4 through the disc-side oil paths 84. Then, lubricating oil lubricates points of contact among the cam surface of the cam disc 8 and the rolling elements, points of contact among the rolling elements and points of contact among the rolling elements and the holding plate. Then, lubricating oil is introduced to a position adjacent to the cam surface of the input disc through a plurality of slits (not shown) formed in the inside portion of the holding plate so as to lubricate the points of contact among the cam surface of the input disc and the rolling elements.

As described above, the angular bearing according to the present invention has an oil supply circuit for lubricating oil which is conveyed to each rotational portion and frictional contact portion. The oil supply circuit is integrated into one system in the angular bearing and the loading cam unit. As a result, a flow rate of lubricating oil required for lubrication can be reduced. Thus, the operation loss of the oil supply pump can be reduced. As a result, the overall efficiency of the toroidal continuously variable-transmission can be improved. In the angular bearing and the loading cam unit, the points of contact among the angular bearing and the balls and the cam surface of the loading cam unit, which are violently swung and rotated, are intensively supplied with lubricating oil through the above-mentioned lubricating passage. Therefore, the durability of the above-mentioned elements can be improved. To furthermore smoothly circulate lubricating oil, it is preferable that the positions of the shaft-side oil paths in the shaft-side raceway groove are positioned adjacent to the jaw portion of the torque input shaft as compared with the position adjacent to the holding unit or the holding unit.

Figure 9:
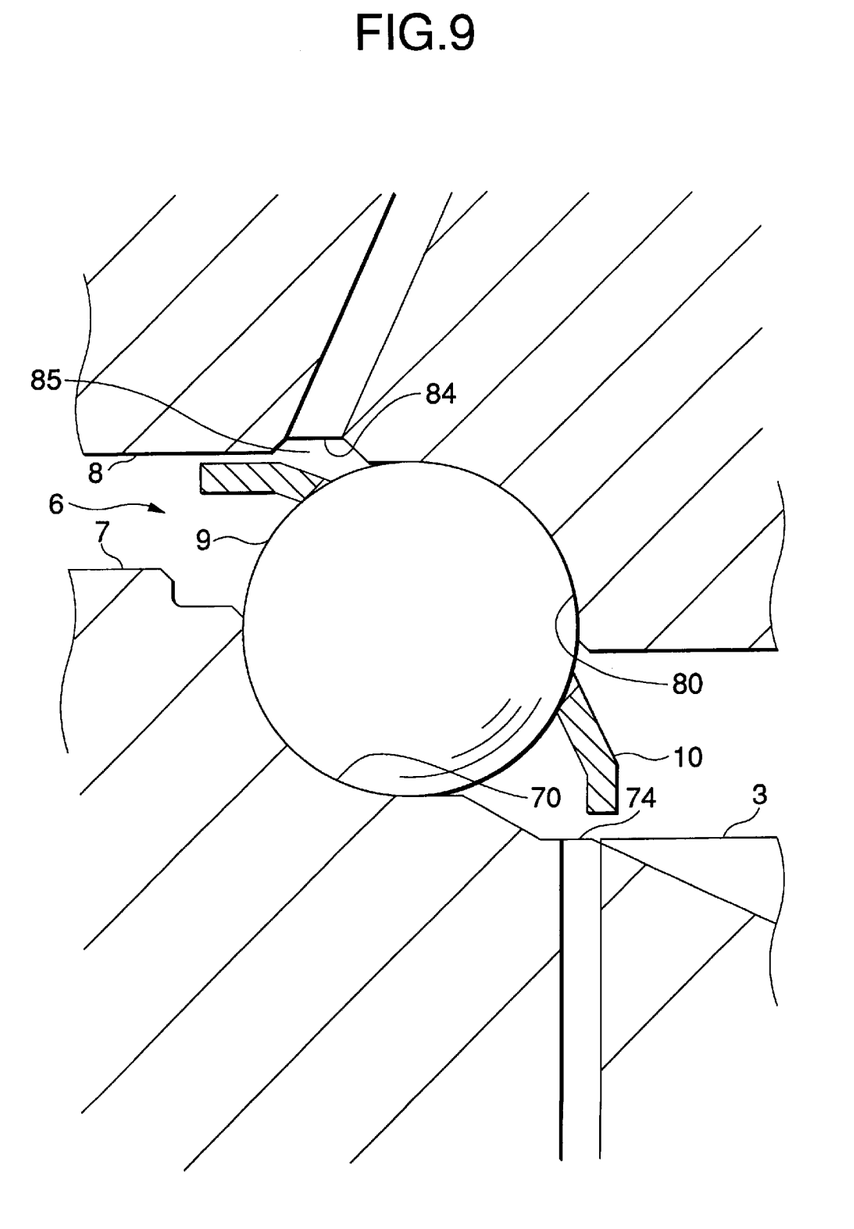
FIG. 9 is an enlarged cross sectional view taken along the axis of a portion including balls of the angular bearing according to the embodiment of the present invention.

FIG. 9 is a further enlarged view showing a position adjacent to the balls of the angular bearing according to the present invention. In this embodiment, an oil reservoir 85 is provided in the disc-side raceway groove 80 side openings of the disc-side oil paths 84. Therefore, lubricating oil in a predetermined quantity can always be stored in the oil reservoir 85. Accordingly, even if centrifugal force which is exerted on lubricating oil is enlarged in a short time owing to rapid rise in the number of revolutions of the cam disc, supply of lubricating oil to the cam surface of the loading cam unit can be maintained.

As described above, the angular bearing of a dual cavity toroidal type continuously variable transmission according to the present invention has dimensions and lubricating passages optimized when the angular bearing has been designed. Therefore, the durability of the bearing portion can be improved and operation loss can be reduced. As a result, the lifetime can be elongated and the efficiency can be improved.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

The present disclosure relates to the subject matter contained in Japanese patent application No. Hei. 10-9023 filed on Jan. 20, 1998 which is expressly incorporated herein by reference in its entirety.

What is claimed is:

1. An angular bearing of a dual cavity toroidal type continuously variable transmission, comprising:

a torque input shaft having a shaft-side raceway groove formed in an outer peripheral surface of a flange portion provided in an end thereof;

a cam disc of a loading cam unit having a disc-side raceway groove formed in an inner peripheral surface of a jointing opening thereof, said cam disc located around the end of said torque input shaft; and a plurality of balls held between said shaft-side raceway groove and said disc-side raceway groove to bear thrust loads exerted on said cam disc, wherein each of an angular contact angle between said balls and said shaft-side raceway groove and an angular contact angle between said balls and said disc-side raceway groove is 60° or smaller, and each of a curvature radius of a groove surface of said shaft-side raceway groove and that of a groove surface of said disc-side raceway groove is from 52% to 55% of a diameter of said ball.

2. An angular bearing of a dual cavity toroidal type continuously variable transmission, comprising:

a torque input shaft having a shaft-side raceway groove formed in an outer peripheral surface of a flange portion provided in an end thereof;

a cam disc of a loading cam unit having a disc-side raceway groove formed in the inner peripheral surface of a joining opening thereof, said cam disc located around the end of said torque input shaft; and a plurality of balls held between said shaft-side raceway groove and said disc-side raceway groove to bear thrust loads exerted on said cam disc, wherein said shaft-side raceway groove includes a bottom portion which intersects a perpendicular extending from the center of each of the plural balls to the outer surface of said torque input shaft;

a first shoulder portion disposed on an edge adjacent to the end of said torque input shaft, a diameter of rotation of which is larger than a pitch circle diameter of said ball; and a second shoulder portion disposed on the other edge apart from the end of said torque input shaft, a diameter of rotation of which is not smaller than a pitch circle diameter of said bottom of said shaft-side raceway groove.

3. An angular bearing of a dual cavity toroidal type continuously variable transmission, comprising:

a torque input shaft having a shaft-side raceway groove formed in an outer peripheral surface of a flange portion provided in an end thereof;

a cam disc of a loading cam unit having a disc-side raceway groove formed in the inner peripheral surface of a joining opening thereof, said cam disc located around the end of said torque input shaft; and a plurality of balls held between said shaft-side raceway groove and said disc-side raceway groove to bear thrust loads exerted on said cam disc, wherein said disc-side raceway groove includes a bottom portion which intersects a perpendicular extending from the center of each of the plural balls to the outer surface of said torque input shaft;

a first shoulder portion disposed on an edge apart from the end of said torque input shaft, a diameter of rotation of which is smaller than a pitch circle diameter of said ball; and a second shoulder portion disposed on the other edge adjacent to the end of said torque input shaft, a diameter of rotation of which is not larger than a pitch circle diameter of said bottom of said shaft-side raceway groove.

4. An angular bearing of a dual cavity toroidal type continuously variable transmission, comprising:

a torque input shaft having a shaft-side raceway groove formed in an outer peripheral surface of a flange portion provided in an end thereof;

a cam disc of a loading cam unit having a disc-side raceway groove formed in the inner peripheral surface of a joining opening thereof, said cam disc located around the end of said torque input shaft;

a holding unit disposed between said shaft-side raceway groove and said disc-side raceway groove; and a plurality of balls held between said shaft-side raceway groove and said disc-side raceway groove to bear thrust loads exerted on said cam disc, said input shaft having a plurality of shaft-side oil paths, each of which communicates an oil supply opening formed inside of said torque input shaft and an opening in the vicinity of said shaft-side raceway groove with each other, said opening of said shaft-side oil path in the vicinity of the shaft-side raceway groove positioned in the vicinity of an end portion of said holding unit in an axial direction of said torque input shaft, and said cam disc having a plurality of disc-side oil paths, each of which communicates an opening in the vicinity of said disc-side raceway groove and a cam surface of said cam disc with each other.

5. An angular bearing of a dual cavity toroidal type continuously variable transmission according to claim 4, wherein lubricating oil supplied through said oil supply paths is introduced into an angular bearing portion through said shaft-side oil openings, and then conveyed to the cam surface of said loading cam unit through said disc-oil paths.

6. An angular bearing of a dual cavity toroidal type continuously variable transmission according to claim 4, wherein said opening in vicinity of said disc-side raceway groove is formed with an oil reservoir which stores lubricating oil of a predetermined quantity.

7. An angular bearing of a dual cavity toroidal type continuously variable transmission, comprising:

a torque input shaft having a shaft-side raceway groove formed in an outer peripheral surface of a flange portion provided in an end thereof;

a cam disc of a loading cam unit having a disc-side raceway groove formed in the inner peripheral surface of a joining opening thereof, said cam disc located around the end of said torque input shaft;

a holding unit disposed between said shaft-side raceway groove and said disc-side raceway groove; and a plurality of balls held between said shaft-side raceway groove and said disc-side raceway groove to bear thrust loads exerted on said cam disc, said input shaft having a plurality of shaft-side oil paths, each of which communicates an oil supply opening formed inside of said torque input shaft and an opening in the vicinity of said shaft-side raceway groove with each other, said opening of said shaft-side oil path in the vicinity of said shaft-side raceway groove positioned between an end portion of said holding unit and said shaft-side raceway groove in an axial direction of said torque input shaft, and said cam disc having a plurality of disc-side oil paths, each of which communicates an opening in the vicinity of said disc-side raceway groove and a cam surface of said cam disc with each other.

8. An angular bearing of a dual cavity toroidal type continuously variable transmission according to claim 7, wherein lubricating oil supplied through said oil supply paths is introduced into an angular bearing portion through said shaft-side oil openings, and then conveyed to the cam surface of said loading cam unit through said disc-oil paths.

9. An angular bearing of a dual cavity toroidal type continuously variable transmission according to claim 7, wherein said opening in vicinity of said disc-side raceway groove is formed with an oil reservoir which stores lubricating oil of a predetermined quantity.

* * * * *